United States Patent [19]
McIntosh

[11] 3,854,815
[45] Dec. 17, 1974

[54] GRAPHIC ARTS CAMERA FLASHING ATTACHMENTS

[75] Inventor: Walter L. McIntosh, Woodbridge, Va.

[73] Assignee: Log Etronics Inc., Springfield, Va.

[22] Filed: Nov. 9, 1973

[21] Appl. No.: 414,478

[52] U.S. Cl. .............................................. 355/67
[51] Int. Cl. ......................................... G03b 27/54
[58] Field of Search ............................... 355/67, 68

[56] References Cited
UNITED STATES PATENTS
3,484,165  12/1969  Denner .............................. 355/67

Primary Examiner—John M. Horan
Attorney, Agent, or Firm—Elliott I. Pollock

[57] ABSTRACT

A flashing exposure, in a Graphic Arts photographic application, is effected by locating flashing lamps adjacent the lens of a graphic arts camera, in the region outside the cone of image forming light and within the limit where the lens structure causes vignetting. Light from the lamps so located is projected through a non-Lambertian diffusion material, having diffusion characteristics within specified limits, through the lens and onto the film plane of the camera. The location of the flashing lamps, in cooperation with the characteristics of the diffusion material, tends to provide uniform illumination throughout the image area at the film plane.

10 Claims, 9 Drawing Figures

DEGREES OFF-AXIS, ALONG DIAGONAL AT FILMPLANE

GRAPHIC ARTS CAMERA FLASHING ATTACHMENTS

BACKGROUND OF THE INVENTION

The present invention is concerned with flashing attachments for use with Graphic Arts process cameras, and is more particularly concerned with an attachment adapted to project flashing light through the lens of the camera to produce a more uniform flashing exposure at the camera film plane than has been possible heretofore.

It is well known in the art that, all other factors being constant, light at the film plane of a camera will vary with the $\cos^4$ of the angle of divergence from the optical axis, of a light ray traversing the path between the lens and the film plane. As a result, light at the corners of the image area in the film plane will be of less intensity than that at the center of the image area. The present invention tends to compensate for this effect.

A flashing exposure in Graphic Arts photography is normally effected, at an appropriate time in the process, via a halftone screen to generate a uniform pattern of geometric, non-image dots of a minimum size, as required in certain halftone reproduction processes. A variety of techniques have been suggested heretofore for producing such flashing exposures. The most common technique is to open the camera back and to expose the film, through a suitable contact screen, to nonimage-forming light derived from a virtual point light source located behind and/or above the camera. Another halftone contact screen technique suggested heretofore involves locating one or more lamps on the lens board of the camera, within the camera bellows, and energizing said lamps so that their light will fall on the film. A still further technique suggested heretofore is to locate a light source on-axis with the camera lens, at a position between the lens and copy board, so that light from the source is transmitted through the lens to the film via the aforementioned halftone screen. A fourth technique involves placing a uniformly lit nonimage-bearing surface, of uniform reflectance, on the copy board, and exposing the screen/film combination briefly to light reflected from the surface. All of these prior techniques suffer from various disadvantages.

The camera back flashing method, referred to above, cannot be used readily with certain automatic cameras, which are becoming increasingly popular in the trade and, in addition, it involves a cameraman's presence in the darkroom during the exposure. Internal flashing, or through-the-lens flashing, does not suffer from these disadvantages.

Internal flashing techniques suggested heretofore do suffer, however, from nonuniform, short duration exposures when reductions are being made (short bellows extension) and from long duration exposures during enlarging operations (long bellows extension), and the consequent possibility of reciprocity law failure if the flashing lamp intensity is maintained unchanged. Conversely, if flashing lamp intensity is changed, the resulting variation in color temperature can cause an exposure error.

Most of the foregoing problems exhibited by internal flashing techniques do not exist for through-the-lens flashing, where diaphragm control may be used to provide on-axis film plane illumination, of substantially constant intensity, independent of bellows extension, thereby minimizing reciprocity law failure. Also, through-the-lens flashing does not involve color temperature changes, because the light source is operated at substantially constant voltage. However, conventional, on-axis flashing does create non-uniform film plane illumination as a result of $\cos^4$ effects, i.e., the on-axis technique suffers from the effect of the inverse square law, producing uneven exposure from the corners to the center of the image area.

Techniques employing a light reflective surface placed on the copy board of a camera are generally inconvenient.

The present invention is concerned with a novel through-the-lens flashing attachment which eliminates the problems discussed above, which have characterized the prior art.

SUMMARY OF THE INVENTION

The present invention provides all the advantages of conventional through-the-lens flashing, i.e., constant color temperature, constant on-axis film-plane illumination, and freedom from reciprocity law failure, with diaphragm control (the usual operation, by a cameraman, of diaphragm adjustment for bellows extension compensation as camera image magnification is varied, similarly and simultaneously adjusts the lens diaphragm for the flashing exposure); but, in contrast to conventional through-the-lens flashing arrangements suggested heretofore, the present invention provides a substantially uniform film plane illumination, eliminating or minimizing $\cos^4$ effects. In addition, the low mass and substantially planar configuration of the selected diffuser along with the permanently mounted concentrically located lamps (which constitute features of the present invention, as will be discussed hereinafter), make the present invention readily adaptable to automatic flashing mechanisms.

In accordance with the present invention, a flashing exposure is achieved, in Graphic Arts photography, by a flashing attachment associated with the camera lens, and characterized by two fundamental structural considerations: (a) the flashing lamps are positioned at particular locations relative to the lens, and (b) light from the lamps is directed through diffusion material having a particular diffusion characteristic, and through the lens structure of the camera, onto the film plane of the camera. These structural features, cooperating with one another, tend to produce uniform flashing exposure throughout the image area, and tend to eliminate light fall-off at the corners of the image area which has characteristically occurred in the techniques employed heretofore.

The flashing lamps are located adjacent the camera lens, at positions between the lens and copy board, in the conical region constituting the light acceptance angle of the lens, but outside the image acceptance angle of the lens. The lamps can, if desired, be mounted within a housing associated with the camera, with the lamps preferably being permanently disposed in the specified region concentric with the optical axis of the lens. Alternatively, the lamps may, if desired, be mounted on a displaceable fixture to permit the lamps to be moved into said position when it is desired to make a flashing exposure, and to move the lamps to an alternate position which does not obstruct the path of image forming light through the lens at other times.

The diffusion material, through which light from the flash lamps passes, has a non-Lambertian characteristic and, more particularly, exhibits diffusion characteristics falling within a specified range to be discussed hereinafter. There are no standard parameters for defining diffusion characteristics, and the diffusion exhibited by any particular optical material is normally expressed by means of a polar curve showing the luminous intensity of a given element of surface viewed from all directions in a plane passing through the normal to that element. The polar curves which define the limits of the diffusion material used in the present invention will be discussed hereinafter, and the claims will recite the characteristics of the diffusion material in terms of such polar plots for lack of a better definition. Considered from a practical point of view, the diffusion material has characteristics falling within the range exhibited by (a) two layers of commercially available DF-3 Mylar (which is a material now used for drafting purposes, comprised of 0.004 inch thick clear Mylar coated on one side with fine silicate particles) or one layer of DF-4 Mylar (which is a similar material coated on both sides thereof), and (b) three layers of said DF-3 Mylar. Such materials are manufactured by Diazo Specialities, 11325 Maryland Ave., Beltsville, Md. 20705.

The diffusion material is located within the path of light from the flashing lamps through the camera lens to the film plane, either at a position outside the camera bellows, e.g., between the lens and flashing lamps, or at a position between the lens and film plane; and in the preferred embodiment of the present invention the diffusion material is mounted upon an adjustable fixture to permit the diffusion material to be moved into the desired position for use during a flashing exposure, and to be moved out of the cone of image forming light at other times.

The particular positions of the flashing lamps, cooperating with the diffusion characteristics of the diffusion material described above, coact to produce a flashing exposure of substantially uniform intensity throughout the image area.

BRIEF DESCRIPTION OF THE DRAWINGS

The foregoing construction and operation of the present invention will be more readily appreciated from the subsequent description and accompanying drawings wherein.

DESCRIPTION OF THE PREFERRED EMBODIMENTS

Figure 1A:
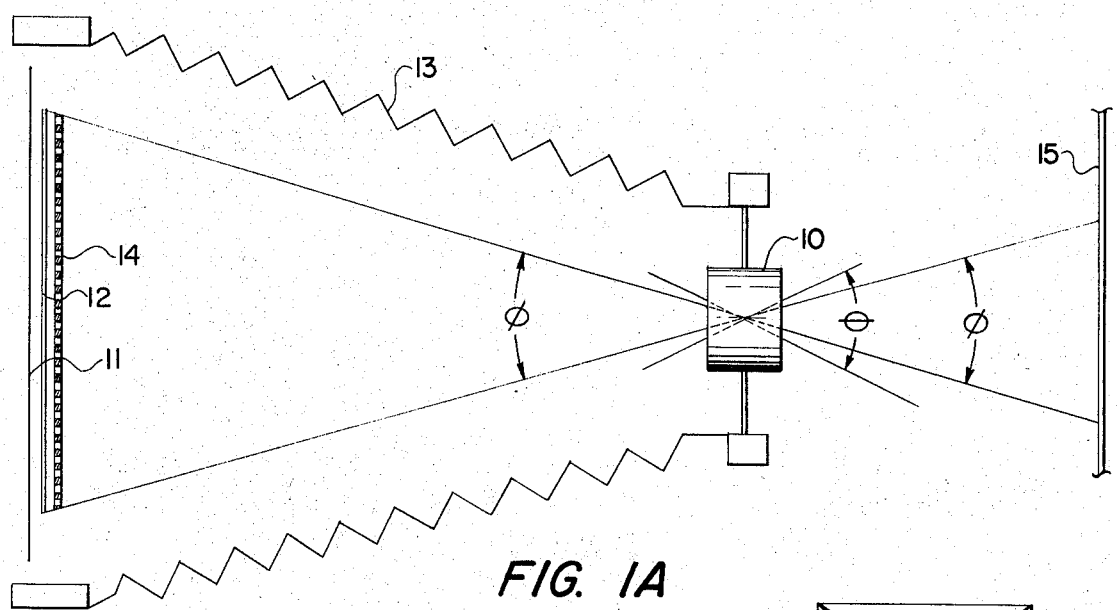
FIG. 1A diagrammatically illustrates a Graphic Arts process camera of the type used with the flashing attachment of the present invention.
Figure 1B:
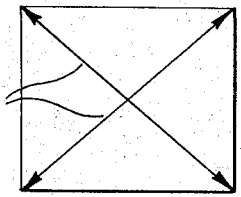
FIG. 1B diagrammatically illustrates the diagonal coverage of the camera lens shown in FIG. 1A.

Referring initially to FIGS. 1A and 1B, a typical process camera of the type with which the present invention is employed comprises a lens 10, a film plane 11 having a sheet of film 12 mounted thereon and enclosed within a light tight region defined by a bellows 13, and a contact screen 14 positioned between film 12 and lens 10 during the making of a flash exposure. The elements 11, 12, and 14, have been shown in spaced relation to one another in FIG. 1A for purposes of clarity, but it will be appreciated that these elements are normally held in intimate contact with one another, e.g., by an appropriate vacuum camera back, with the contact screen 14 in intimate surface engagement with film 12. The overall process camera includes, moreover, a copy board 15 disposed on the side of lens 10 opposite the film plane, and mechanisms (not shown) are normally provided for accurately positioning film 12, a lens board bearing lens 10 thereon, and the copy board 15 relative to one another.

The angle $\phi$ depicted in FIG. 1A defines the diagonal coverage of lens 10 with respect to film plane 11 and copy board 15. This angle $\phi$ is selected in the lens design to provide area coverage having an acceptable image resolution, and the conical region defined by angle $\phi$ will be termed hereinafter the image acceptance angle of the lens. FIG. 1A further illustrates an angle $\theta$ which represent an angle of coverage greater than angle $\phi$ and less than some limit where the lens structure causes vignetting, and the conical region defined by angle $\theta$ will be termed hereinafter the light acceptance angle of the lens.

Figure 2:
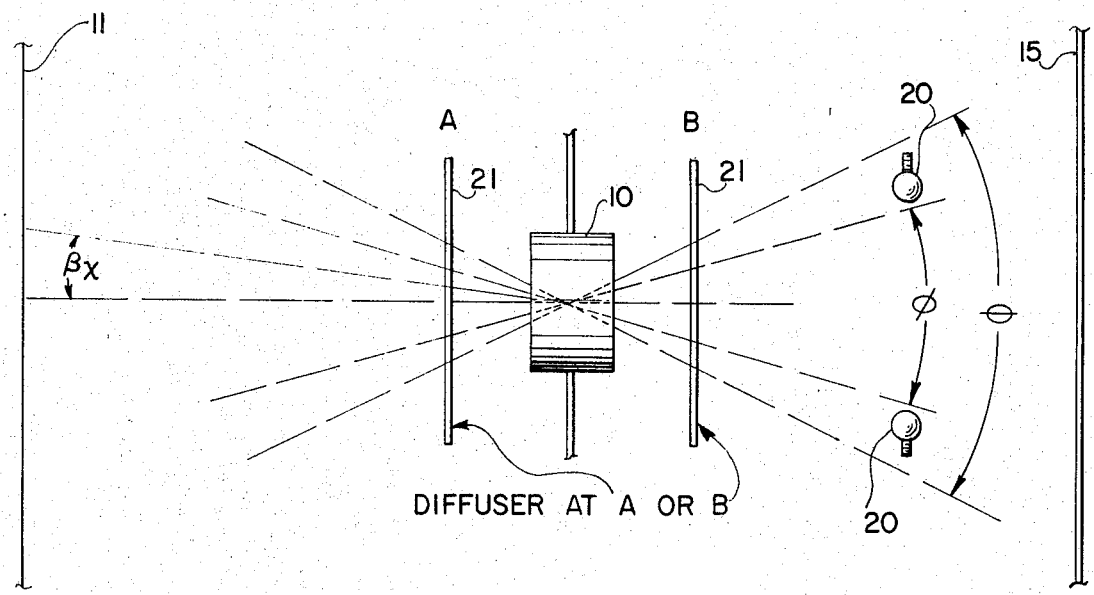
FIG. 2 diagrammatically illustrates a portion of the Graphic Arts camera, shown in FIG. 1A, with the flashing attachment of the present invention added thereto.

FIG. 2 depicts certain portions of the camera of FIG. 1A, modified to include a flashing attachment of the type contemplated by the present invention. A diffuser structure may be located either at position A, between lens 10 and film plane 11 (i.e., within bellows 13) or at position B, which is the preferred position, between lens 10 and copy board 15. The characteristics of the diffuser, whether positioned at A or B, will be the same and will be discussed hereinafter. The diffuser is preferably mounted for movement into position A or B when it is desired to effect a flashing exposure, and for movement out of the path of image forming light through the lens at other times. The flashing attachment further includes lamps 20 located within the region defined at its interior by the image acceptance angle of lens 10 and at its exterior by the light acceptance angle of the lens, i.e., within the angle $\theta - \phi$. The lamps 20, when individual lamps are employed, normally constitute four such lamps located along diagonals parallel to the diagonals of the film plane (see FIG. 1B) but alternative lamp configurations are possible as will be discussed hereinafter in reference to FIG. 5.

Considering the overall structure shown in FIG. 2, without regard initially to the characteristics of the diffuser at A or B, when a flash exposure is to be made the diffuser is placed in one of the two positions depicted in FIG. 2, and the lamps 20 are turned on. If the diffuser 21 were an ideal diffuser following Lambert's cosine law (hereinafter called a Lambertian diffuser), then the diffuser would merely act as a diffuse source of illumination, and the luminous flux density at the film plane 11 i.e., the illuminance, would follow the well known cosine-fourth law, i.e., $\cos^4 \beta$, where $\beta$ is the angle of divergence from the optical axis of the lens of a given ray. It has been a failing of all prior art systems using a through-the-lens flashing technique that cosine-fourth intensity fall off at locations significantly off-axis, e.g., at the corners of the image area (see FIG. 1B) produced unevenly flashed exposures. It has been for this reason primarily that most prior Graphic Arts systems employ dark room flashing from overhead flashing lamps positioned six to ten feet above the film plane.

In accordance with the present invention, these characteristics of the prior art are overcome by using a light source or sources positioned outside angle $\phi$ but inside angle $\theta$, in conjunction with a diffuser 21 which does not follow Lambert's cosine law (hereinafter called a non-Lambertian diffuser) and, more particularly, to use light sources so located in conjunction with a non-Lambertian diffuser having particular diffusion characteristics which will now be discussed.

As mentioned previously, there are no commonly recognized parameters to define the diffusion characteristics of a diffusion material, and it has accordingly become the practice to specify diffusion characteristics by polar curves of relative illumination versus viewing angle. A family of such curves is shown in FIG. 3 for various types of diffusion material.

Figure 4:
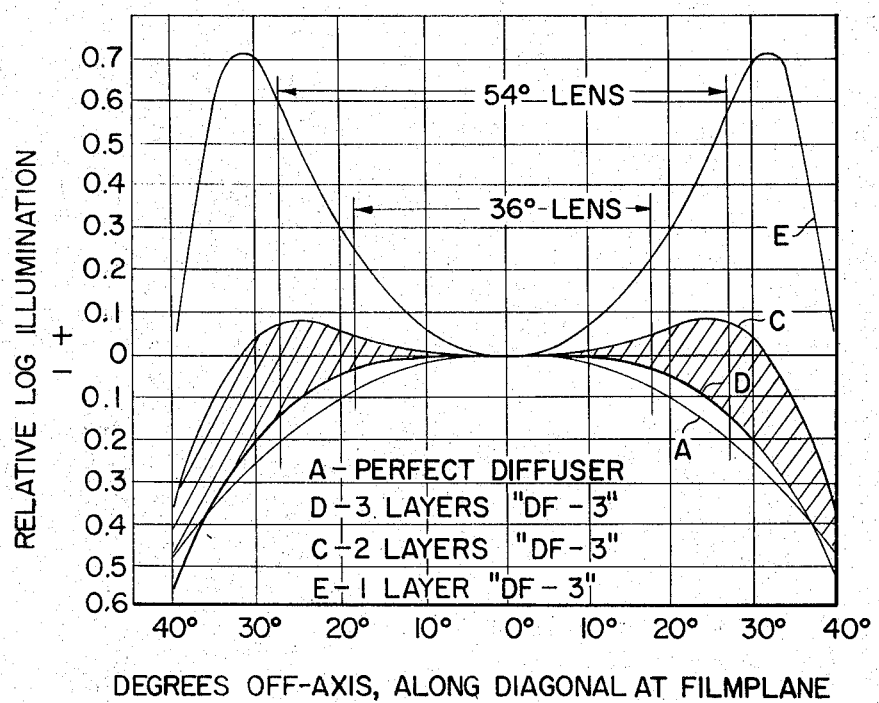
FIG. 4 is a family of curves depicting relative illumination along diagonals of the film plane shown in FIG. 1B, for various diffusion materials and various lens image acceptance angles.

Curve A constitutes the polar plot of a perfect diffuser i.e., a Lambertian diffuser. Such a diffuser exhibits a distribution of flux such that the flux per unit solid angle in any direction from a plane surface varies as the cosine of the angle between that direction and the perpendicular to the surface. The luminance of such a surface is uniform at all viewing angles. Such a material is not applicable to the present invention, as depicted by corresponding curve A in FIG. 4 (which exhibits too much diffusion for purposes of the present invention). More particularly as shown in FIG. 4, use of a perfect diffuser would cause a significant fall off in the level of illumination along diagonals at the film plane, the effect of which would become increasingly apparent as the image acceptance angle of the lens is widened.

Figure 3:
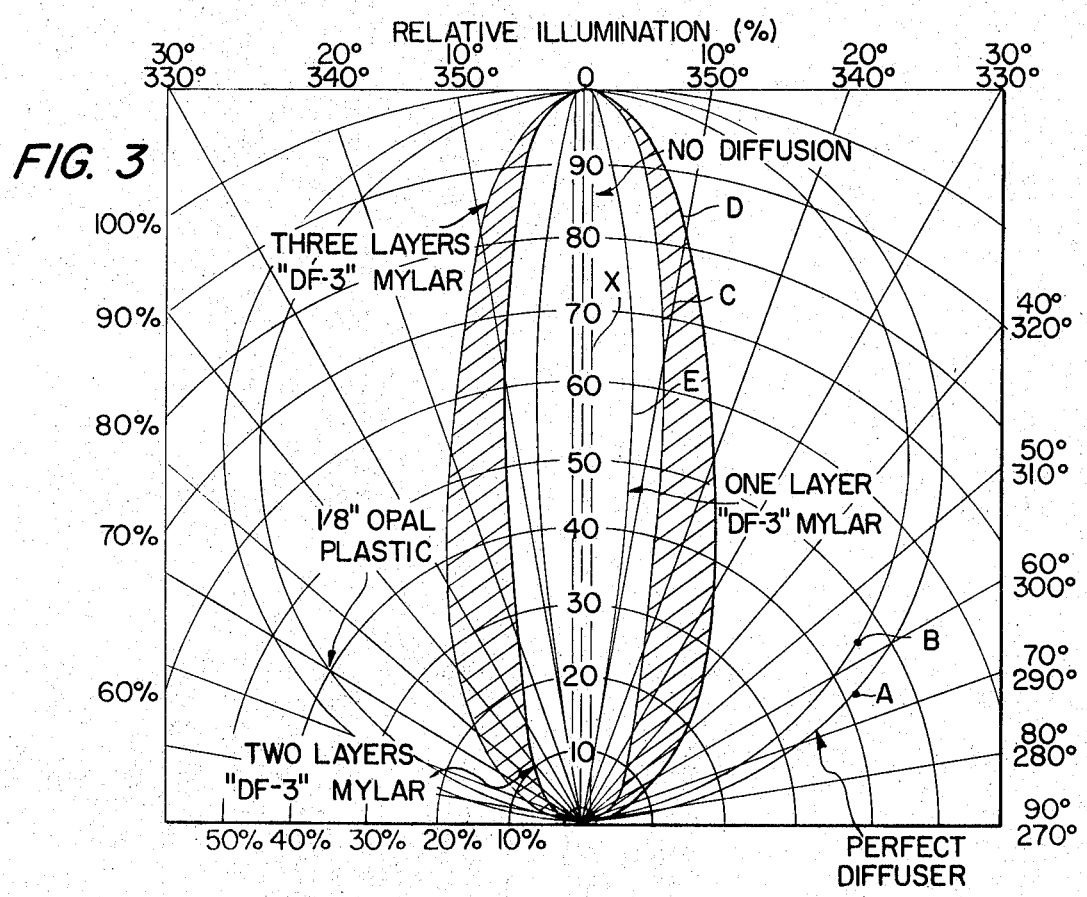
FIG. 3 is a group of polar curves depicting the diffusion characteristics of various diffusion materials, including the materials employed in the practice of the present invention.

Curve B in FIG. 3 depicts the diffusion characteristics of a very commonly employed diffusion material i.e., one-eighth inch opal plastic. No corresponding curve is shown in FIG. 4, and curve B has been presented in FIG. 3 merely to illustrate that this commonly used diffusion material is substantially Lambertian in character, i.e., it does not have diffusion characteristics significantly different from the perfect diffuser of curve A. Accordingly, for purposes of the present discussion, the diffusion material most commonly employed in the prior art can be treated as a substantially Lambertian diffuser, use of which will result in an unevenness of exposure which the present invention is intended to minimize.

Curves C, D, and E were plotted using a measuring light beam having a divergence of substantially 2°, incident perpendicular to the plane of the diffusion material, and the nature of the light beam employed for these plots has been represented in FIG. 3 as curve X. Using this light beam, curve C represents the diffusion characteristics achieved by two layers of commercially available DF-3 material (identified previously) in intimate contact with one another, or by its equivalent structure, i.e., a single layer of DF-4 material; curve D represents the diffusion characteristics, again measured by a light beam of the type described above, for three layers of DF-3 material; and curve E represents the characteristics, similarly measured, of one layer of DF-3 material (which exhibits too little diffusion for purposes of the present invention). The region between curves C and D represents the range of diffusivity which is acceptable in the practice of the present invention, and this region has been cross hatched in FIGS. 3 and 4 for purposes of clarity.

The various plots of curves C, D and E in FIG. 3 were based upon the following data, which is presented to more clearly define the diffusivity characteristics of the three materials represented thereby:

CURVE C: TWO LAYERS DF-3 or ONE LAYER DF-4

AMPLITUDE VERSUS ANGLE, NORMALIZED TO 100%

| Rel. Illum. Left | Viewing Angle | Rel. Illum. Right |
|---|---|---|
| 96 | 3° | 96 |
| 88 | 5° | 88 |
| 78 | 7° | 78 |
| 60 | 10° | 60 |
| 38 | 15° | 38 |
| 26 | 20° | 26 |
| 19 | 25° | 19 |
| 14 | 30° | 14 |
| 11 | 35° | 11 |
| 9 | 40° | 9 |
| 7 | 50° | 7 |
| 4.5 | 60° | 4.5 |
| 2.5 | 70° | 2.5 |

CURVE D: THREE LAYERS DF-3

AMPLITUDE VERSUS ANGLE, NORMALIZED TO 100%

| Rel. Illum. Left | Viewing Angle | Rel. Illum. Right |
|---|---|---|
| 95 | 5° | 95 |
| 82 | 10° | 82 |
| 64 | 15° | 64 |
| 53 | 20° | 53 |
| 43 | 25° | 43 |
| 36 | 30° | 36 |
| 31 | 35° | 31 |
| 26 | 40° | 26 |
| 22 | 45° | 22 |
| 18.5 | 50° | 18.5 |
| 12 | 60° | 12 |
| 6.5 | 70° | 6.5 |
| 2 | 80° | 2 |

CURVE E: ONE LAYER DF-3

AMPLITUDE VERSUS ANGLE, NORMALIZED TO 100%

| Rel. Illum. Left | Viewing Angle | Rel. Illum. Right |
|---|---|---|
| 95 | 1° | 95 |
| 80 | 3° | 80 |
| 58 | 5° | 58 |
| 40 | 7° | 38 |
| 21 | 10° | 21 |
| 8 | 15° | 8 |
| 4.25 | 20° | 4.25 |
| 2.5 | 25° | 2.5 |

The effect of using a diffusion material having characteristics falling within the limits defined by curves C and D, in association with lamps positioned in the manner illustrated in FIG. 2, is shown in FIG. 4. For a lens having a 36° image acceptance angle, the illumination at the corners of the diagonal coverage (see FIG. 1B) using the diffusion material characterized by curve C is slightly higher than the illumination on axis, whereas the illumination at the corners using a material having the characteristics of curve D is slightly below the illumination on axis. The material of either curve C or curve D is accordingly acceptable for use with a 36° lens. It should be noted, however, that whereas the material of curve C remains acceptable for use with a 54° lens, the corner fall off with such a lens, when using the material characterized by curve D, may be excessive; and therefore the material of curve C is preferable to that of curve D for such a 54° lens application. In short, diffusion materials having characteristics falling between those of curves C and D represent preferred embodiments of the present invention which, in all cases, exhibit characteristics better than those achieved by a Lambertian radiator of the type represented by curve A (which has too much diffusion) or a material of the type represented by curve E (which does not have sufficient diffusion); but a particular one of the materials represented by curves C and D, or having a diffusion characteristic in the range therebetween, may be best for any particular application to effect the desired uniformity of illumination of the image area at the film plane. The material best suited for any given application can be selected by reference to the curves of FIG. 4, or by a similar analysis.

Figure 5A:
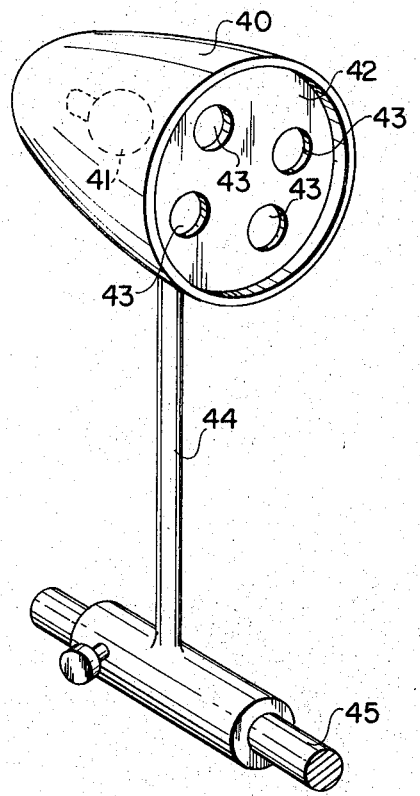
FIGS. 5A, 5B, and 5C depict, respectively, alternative flashing lamp arrangements which may be employed in the practice of the present invention.
Figure 5B:
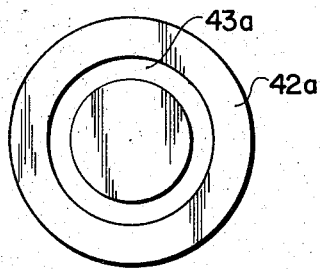
Figure 5C:
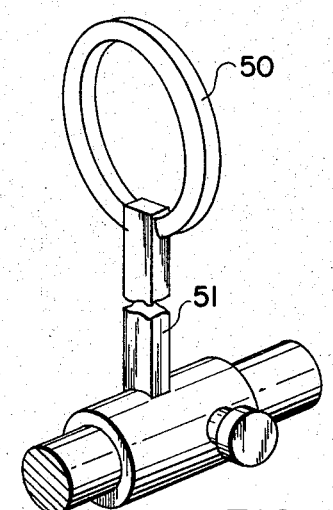
Figure 6:
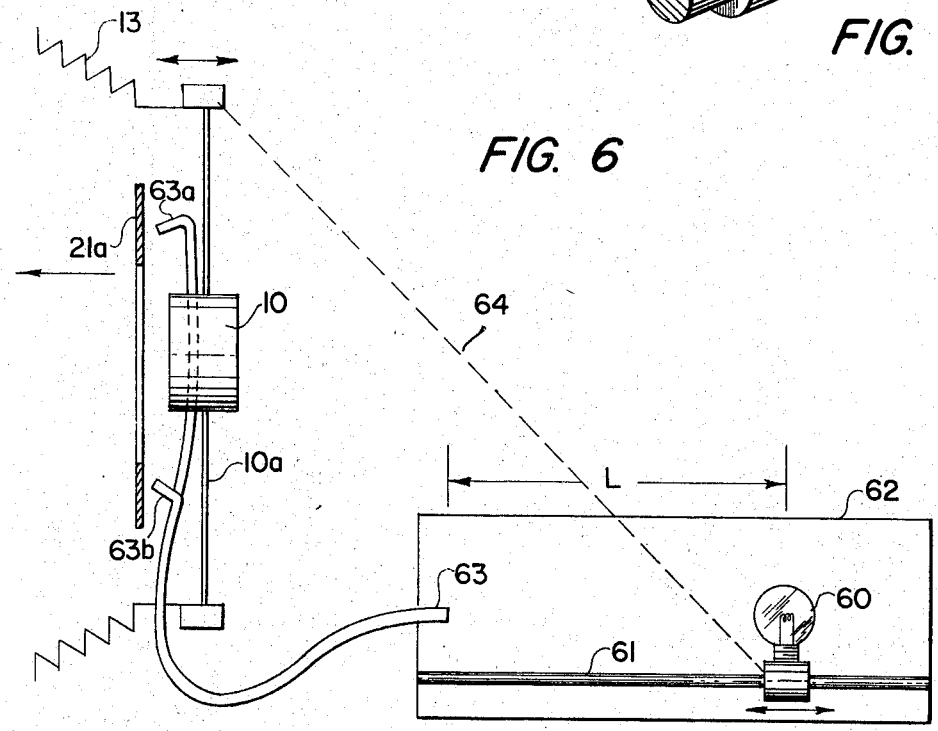
FIG. 6 depicts a lamp arrangement utilizing the principles of the present invention for internal flashing, and adapted to provide automatic compensation for variations in bellows extension.

The multiple lamp structure of FIG. 2 can be modified as shown, for example, in FIGS. 5 and 6. FIG. 5A depicts a light source comprising a unitary housing 40 having a reflective interior surface containing a single lamp 41 associated with an opaque aperture plate 42 having at least four light apertures 43 therein positioned equidistantly from one another in a circular locus adapted to be disposed within the angular region θ − φ discussed previously in reference to FIG. 2. The light source is mounted on an arm 44 swingable about a stationary shaft 45 to permit the light source to be aligned with the optical axis of lens 10, so as to position the various apertures 43 in the manner previously described, when it is desired to effect a flashing exposure and adapted otherwise to move the light source away from the lens axis to avoid interference with image forming light at other times.

FIG. 5B represents a variant of FIG. 5A wherein the aperture plate 42a is provided with a single transparent opening 43a of circular configuration, in place of the various spaced apertures 43 previously described in reference to FIG. 5A. In the arrangement of FIG. 5B the aperture plate may constitute an opaque plastic material having a transparent window formed therein. An entirely similar effect can be achieved by the arrangement of FIG. 5C wherein a circular lamp 50 is provided on a swingable arm 51 for disposition selectively within the region θ − φ. Since the central region of the circular lamp 50 is unobstructed, it is not essential that an arrangement according to FIG. 5C be adapted for swingable movement, and the circular lamp may, if desired, be permanently positioned relative to the lens for flashing exposures when necessary.

FIG. 6 shows a still further arrangement adapted to compensate for light intensity variations resulting from variations in bellows extension. The flashing lamp 60 is mounted for movement along a support structure 61 within a fixed housing 62 one end of which supports a bifurcated fiber optics bundle 63, two bifurcated bundles of which are designated 63a and 63b (four such bundles would preferably be provided). A linkage 64 is provided between lens board 10a and the movable support for lamp 60 to vary the distance L between lamp 60 and the fixed end of bifurcated bundle 63 in inverse proportion to the distance between the film plane and lens 10 in the camera. The light emitting ends of bifurcated bundles 63a and 63b move with lens board 10a to project light through an associated diffuser 21a and, by the arrangement described, the light intensity so projected will increase (due to a decrease in distance L) as the bellows extension increases thereby to maintain the flashing light intensity at the film plane substantially constant for all bellows extensions. It will be appreciated that an entirely similar effect could be achieved by holding the lamp 60 at a stationary position, and varying the position of the input end of fiber optics bundle 63 relative thereto.

Since neither the fiber optics bundle nor diffuser 21a, in FIG. 6, obstruct the path of image-forming light through lens 10, the arrangement of FIG. 6 can be used to effect simultaneous, rather than sequential, main and flashing exposures thereby reducing the total exposure time.

While I have thus described preferred embodiments of the present invention many variations will be apparent to those skilled in the art. It must therefore be understood that the foregoing description is intended to be illustrative only and not limitative of the present invention and all such variations and modifications as are in accord with the principles described are meant to fall within the scope of the appended claims.

Having thus described my invention I claim:

1. A flashing attachment for a Graphic Arts process camera of the type comprising a lens structure the optical axis of which is at right angles to a film plane structure disposed on one side of said lens structure and at right angles to a copyboard structure disposed on the other side of said lens structure, said attachment comprising a flashing light source located within the light acceptance angle of said lens structure and outside the image acceptance angle of said lens structure for selectively projecting flashing light toward said film plane structure, and translucent light diffusing material disposed between said flashing light source and said film plane structure for controlling the intensity of flashing light incident on said film plane structure to produce illuminance of substantially uniform intensity throughout a predetermined area of a sheet of photosensitive material supported by said film plane structure, said diffusing material comprising a non-Lambertian radiator the diffusion characteristics of which, when using a measuring light beam having a divergence of substantially 2° and incident perpendicular to the diffusing material, are defined by a polar curve of light intensity versus viewing angle exhibiting a light intensity 10° off-axis not more than 82 percent and not less than 60 percent of the intensity on-axis, exhibiting a light intensity 20° off-axis not more than 53 percent and not less than 26 percent of the intensity on-axis, exhibiting an intensity 30° off-axis not more than 36 percent and not less than 14 percent of the intensity on-axis, exhibiting an intensity 40° off-axis not more than 26 percent and not less than 9 percent the intensity on-axis, and exhibiting an intensity 50° off-axis not more than 18.5 percent and not less than 7 percent the intensity on-axis.

2. The flashing attachment of claim 1 wherein said flashing light source is located about said axis of said lens structure at a position between said lens structure and said copyboard for projecting flashing light through said lens structure toward said film plane structure.

3. The flashing attachment of claim 2 wherein said light source is mounted for movement into and out of said position.

4. The flashing attachment of claim 2 wherein said diffusing material is located at a further position between said flashing light source and said lens structure.

5. The flashing attachment of claim 4 wherein said diffusing material is mounted for movement into and out of said further position.

6. The flashing attachment of claim 2 wherein said camera includes a light-tight structure interconnecting said lens structure and said film plane structure, said diffusing material being located within said light-tight structure between said lens structure and said film plane structure.

7. The flashing attachment of claim 2 wherein said flashing light source comprises a plurality of lamps located in spaced relation to one another in a circular locus about said axis of said lens structure.

8. The flashing attachment of claim 1 wherein said flashing light source comprises a plurality of light sources disposed in a circular locus about said axis of said lens structure.

9. The flashing attachment of claim 8 wherein said light sources comprise fiber optics bundles.

10. The flashing attachment of claim 1 wherein said camera includes an extensible light-tight structure interconnecting said lens structure and said film plane structure, and means responsive to variations in the extension of said light-tight structure for varying the intensity of said flashing light source.

* * * * *